United States Patent [19]

Matsumoto et al.

[11] Patent Number: 4,737,312
[45] Date of Patent: Apr. 12, 1988

[54] LIQUID CRYSTAL COMPOSITION

[75] Inventors: Shoichi Matsumoto; Hitoshi Tomii, both of Yokohama, Japan; Bernhard Scheuble, Alsbach, Fed. Rep. of Germany; Georg Weber, Erzhausen, Fed. Rep. of Germany; Ian C. Sage, Poole, Great Britain

[73] Assignees: Merck Patent Gesellschaft mit beschrankter Haftung, Darmstadt, Fed. Rep. of Germany; Toshiba Corporation, Kawasaki, Japan

[21] Appl. No.: 890,191

[22] PCT Filed: Oct. 10, 1985

[86] PCT No.: PCT/EP85/00529

§ 371 Date: Jun. 17, 1986

§ 102(e) Date: Jun. 17, 1986

[87] PCT Pub. No.: WO86/02375

PCT Pub. Date: Apr. 24, 1986

[30] Foreign Application Priority Data

Oct. 17, 1984 [DE] Fed. Rep. of Germany ..... 84112484

[51] Int. Cl.$^4$ .......... G02F 1/13; C09K 19/34; C09K 19/54
[52] U.S. Cl. .......... 252/299.61; 252/299.5; 350/350 R
[58] Field of Search .......... 252/299.5, 299.61; 350/350 R

[56] References Cited

U.S. PATENT DOCUMENTS

| | | | |
|---|---|---|---|
| 4,313,878 | 2/1982 | Hsu | 252/299.61 |
| 4,356,104 | 10/1982 | Hsu | 252/299.61 |
| 4,364,838 | 12/1982 | Boller et al. | 252/299.61 |
| 4,391,730 | 7/1983 | Kuschel et al. | 252/299.61 |
| 4,450,094 | 5/1984 | Sato et al. | 252/299.61 |
| 4,490,276 | 12/1984 | Hsu | 252/299.61 |
| 4,510,069 | 4/1985 | Eibenschine et al. | 252/299.62 |
| 4,643,841 | 2/1987 | Ishii et al. | 252/299.61 |

FOREIGN PATENT DOCUMENTS

| | | | |
|---|---|---|---|
| 56501 | 7/1982 | European Pat. Off. | 252/299.61 |
| 137210 | 4/1985 | European Pat. Off. | 252/299.01 |
| 151446 | 8/1985 | European Pat. Off. | 252/299.61 |
| 176039 | 4/1986 | European Pat. Off. | 252/299.61 |
| 3315295 | 10/1984 | Fed. Rep. of Germany | 252/299.61 |
| 3404117 | 8/1985 | Fed. Rep. of Germany | 252/299.61 |
| 3404116 | 8/1985 | Fed. Rep. of Germany | 252/299.61 |
| 58-65781 | 4/1983 | Japan | 252/299.61 |
| 59-1586 | 1/1984 | Japan | 252/299.61 |
| 59-6274 | 1/1984 | Japan | 252/299.61 |
| 60-13883 | 1/1985 | Japan | 252/299.61 |
| 2067586 | 7/1981 | United Kingdom | 252/299.61 |
| 2080561 | 2/1982 | United Kingdom | 252/299.01 |
| 2092169 | 8/1982 | United Kingdom | 252/299.61 |

*Primary Examiner*—Teddy S. Gron
*Attorney, Agent, or Firm*—Millen & White

[57] ABSTRACT

Liquid crystal compositions containing at least one compound of the formula I $$\text{R-Dio-Ph-CN} \qquad \text{I}$$

wherein R is alkyl of 2 to 5 carbon atoms, Dio is trans-1,3-dioxane-2,5-diyl and Ph is 1,4-phenylene, and at least one compound of each of the following groups A to D:

$$R^1\text{-Cy-Ph-}R^2 \qquad \text{A}$$

$$R^3\text{-Cy-Ph-Ph-}R^4 \qquad \text{B}$$

$$R^5\text{-Cy-Ph-CN} \qquad \text{C}$$

$$R^6\text{-Cy-COO-Ph-O-}R^7 \qquad \text{D}$$

and, in addition in a total amount of 10 to 26% by weight at least five compounds of the formula E $$R^8\text{-Pyr-Ph-O-}R^9 \qquad \text{E}$$

or at least one compound of each of the following groups F to K:

$$R^{10}\text{-Ph-COO-Ph-}R^{11} \qquad \text{F}$$

$$R^{12}\text{-Cy-COO-Ph-Ph-CN} \qquad \text{G}$$

$$R^{13}\text{-Ph-Ph-COO-Ph-Ph-CN} \qquad \text{H}$$

$$R^{14}\text{-Ph-COO-Ph-COO-Ph-}R^{15} \qquad \text{J}$$

$$R^{16}\text{-Ph-Ph-COO-PhF-}R^{17} \qquad \text{K}$$

result in surprisingly steep electrooptical characteristics and surprisingly low viewing-angle dependence of the contrast at simultaneously acceptable threshold voltages for commercially available drivers and multiplex ratios up to 1:100 when used in matrix displays.

4 Claims, No Drawings

LIQUID CRYSTAL COMPOSITION

BACKGROUND OF THE INVENTION

The invention relates to liquid crystal compositions suitable for use in electro-optical matrix displays of the twisted nematic cell type, and to an electro-optical matrix display using the liquid crystal composition mentioned above.

There is still a great demand for liquid crystal compositions (LC compositions) suitable for matrix displays having an electrooptical characteristic (contrast/voltage curve) as steep as possible and simultaneously a low threshold voltage. In such matrix displays, each "display point" of an electrode grid can be selectively triggered by applying a voltage to a first electrode layer, consisting of a multiplicity of horizontral rows of conductors, and to another electrode layer, consisting of a multiplicity of vertical rows of conductors (multiplex drive). The highr the multiplex ratio and the lower the maximum voltage of the available drivers, the lower the threshold voltage of the LC composition has to be. A disadvantage of these matrix display elements is the partial activation of display points in the immediate vicinity of a triggered display point, which partial activation is called "crosstalk" and reduces the contrast of the display in an undesirable manner. The steeper the electro-optical characteristic of the LC composition used in a display element of this type, the less such crosstalk is then observed. As a rule, the steepness of the electro-optical characteristic of a LC composition is given as the ratio of the control voltages V which must be applied to a given display element in order to obtain 10% of the maximum contrast ($V_{10}$) and 50% of the maximum contrast ($V_{50}$).

The steepness of the electro-optical characteristic is the greater, the smaller the ratio $$\gamma = \frac{V_{50} - V_{10}}{V_{10}} \cdot 100[\%]$$

Till today the steepness of the electro-optical characteristic can only be determined by experiment, because all theoretical predictions ended up to now in rather wrong results.

Besides of a decrease of the contrast with increasing multiplex ratio, there is also a strongly increasing viewing-angle dependence of the contrast. This dependence is defined as $$\beta = \frac{V_{10,0,25} - V_{10,40,25}}{\frac{1}{2}(V_{10,0,25} + V_{10,40,25})} \cdot 100[\%]$$

wherein $V_{x,y,z}$ is the applied control voltage at x % contrast, viewing angle y and temperature z° C.

The smaller $\beta$, the better is the optical performance of the matrix display.

SUMMARY OF THE INVENTION

It has now been found that LC compositions according to the invention result in surprisingly steep electro-optical characteristics and surprisingly low viewing-angle dependence of the contrast at simultaneously acceptable threshold voltages for commercially available drivers and multiplex ratios up to 1:100 when used in matrix displays.

The invention thus relates to a liquid crystal composition, characterized in that it contains at least one compound of the formula I R-Dio-Ph-CN  I wherein R is alkyl of 2 to 5 carbon atoms, Dio is trans-1,3-dioxane-2,5-diyl and Ph is 1,4-phenylene, and at least one compound of each of the following groups A to D:

$R^1$-Cy-Ph-$R^2$  A wherein $R^1$ and $R^2$ are each alkyl of 3 to 5 carbon atoms, Cy is trans-1,4-cyclohexylene and Ph is 1,4-phenylene, $R^3$-Cy-Ph-Ph-$R^4$  B wherein $R^3$ and $R^4$ are each alkyl of 2 to 5 carbon atoms and Cy and Ph have the meanings indicated above, $R^5$-Cy-Ph-CN  C wherein $R^5$ is alkyl of 2 to 5 carbon atoms and Cy and Ph have the meanings indicated above, $R^6$-Cy-COO-Ph-O-$R^7$  D wherein $R^6$ and $R^7$ are each alkyl of up to 5 carbon atoms and Cy and Ph have the meanings indicated above, and, in addition in a total amount of 10 to 26% by weight at least five compounds of the formula E $R^8$-Pyr-Ph-O-$R^9$  E wherein $R^8$ and $R^9$ are each alkyl of 5 to 11 carbon atoms, Pyr is pyrimidine-2,5-diyl and Ph has the meaning indicated above,
or at least one compound of each of the following groups F to K:

$R^{10}$-Ph-COO-Ph-$R^{11}$  F wherein $R^{10}$ and $R^{11}$ are each alkyl of 1 to 7 carbon atoms, Ph has the meaning indicated above, $R^{12}$-Cy-COO-Ph-Ph-CN  G wherein $R^{12}$ is alkyl of 1 to 3 carbon atoms, and Cy and Ph have the meaning indicated above.

$R^{13}$-Ph-Ph-COO-Ph-Ph-CN  H wherein $R^{13}$ is alkyl of 6 to 8 carbon atoms and Ph has the meaning indicated above.

$R^{14}$-Ph-COO-Ph-COO-Ph-$R^{15}$  J wherein $R^{14}$ and $R^{15}$ are each alkyl of 1 to 5 carbon atoms and Ph has the meaning indicated above, $R^{16}$-Ph-Ph-COO-PhF-$R^{17}$  K wherein $R^{16}$ and $R^{17}$ are each alkyl of 5 to 7 carbon atoms, PhF is fluorinated 1,4-phenylene and Ph has the meaning indicated above,
and to an electro-optical display device, characterized that it contains a liquid crystal composition according to the above.

The LC compositions according to the invention preferably contain at least two compounds of the formula I preferably in a total amount of 10 to 25, preferably 11,5 to 20% by weight.

The LC compositions according to the first aspect of the invention preferably contain only one compound of the formula A preferably in an amount of 5 to 15% by weight, preferably at least two compounds of the formula B preferably in an total amount of 15 to 25% by weight and preferably only one compound of the formula C preferably in an amount of 5 to 10% by weight. These LC compositions according to the invention preferably contain at least three compounds of the formula D preferably in a total amount of 10 to 26% by weight.

$R^6$ preferably is straight chain alkyl of 3 to 5 carbon atoms. $R^7$ preferably is methyl.

These LC compositions according to the invention preferably contain five compounds of the formula E preferably in a total amount of 20 to 25% by weight.

$R^8$ preferably is n-hexyl.

The LC compositions according to the second aspect of the invention preferably contain at least six compounds of the formula F preferably in a total amount of 50 to 65% by weight and preferably only one compound of the formula G preferably in an amount of 5 to 15% by weight, $R^{12}$ is preferably ethyl.

These LC compositions according to the invention preferably contain only one compound of the formula H preferably in an amount of 1 to 5% by weight. $R^{13}$ is preferably n-heptyl.

These LC compositions according to the invention preferably contain only one compound of the formula J preferably in an amount of 3 to 7% by weight.

$R^{14}$ and $R^{15}$ are preferably n-propyl.

These LC compositions according to the invention furthermore preferably contain only one compound of the formula K preferably in an amoount of 7 to 11% by weight.

$R^{16}$ is preferably n-heptyl and $R^{17}$ is preferably n-pentyl and PhF is preferably 2-fluoro-1,4-phenylene.

The preparation of the LC compositions according to the invention is carried out in a manner which is conventional per se. The single components are known from the prior art. As a rule, the desired quantity of the components used in a smaller quantity is dissolved in the component(s) representing the main constituent, advantageously at an elevated temperature. If the temperature selected here is above the clearing point of the main constituent, the completeness of the solution process can be observed with particular ease.

It is also possible, however, to mix solutions of the components in a suitable organic solvent, for example acetone, chloroform or methanol, and, after thorough mixing, to remove the solvent again, for example by distillation under reduced pressure. Of course, it is necessary in this procedure to take care that no impurities or undesired doping substances are introduced by the solvent.

The examples which follow are intended to explain the invention without restricting it. Parts or percentage figures denote parts by weight or percent by weight respectively.

EXAMPLE A

A LC composition consisting of
7% 2-p-cyanophenyl-5-propyl-1,3-dioxane,
7% 2-p-cyanophenyl-5-butyl-1,3-dioxane,
6% 2-p-cyanophenyl-5-pentyl-1,3-dioxane,
8% p-trans-4-propylcyclohexyl-benzonitrile,
12% 4-ethyl-4'-(trans-4-propylcyclohexyl)-biphenyl,
11% 4-ethyl-4'-(trans-4-pentylcyclohexyl)-biphenyl,
3% 2-p-pentoxyphenyl-5-hexylpyrimidine,
3% 2-p-hexoxyphenyl-5-hexylpyrimidine,
4% 2-p-heptoxyphenyl-5-hexylpyrimidine,
6% 2-nonoxyphenyl-5-hexylpyrimidine,
6% 2-p-undecoxyphenyl-5-hexylpyrimidine,
7% trans-4-propylcyclohexancarboxylic acid-(p-methoxyphenylester),
5% trans-4-butylcyclohexancarboxylic acid-(p-methoxyphenylester),
4% trans-4-pentylcyclohexancarboxylic acid-(p-methoxyphenylester) and
11% trans-1-p-propylphenyl-4-pentylcyclohexane
has a clear point of 61° C. and a viscosity of 31 mPa.s at 20° C.

EXAMPLE B

A LC composition consisting of
8.2% 4-(5-ethyl-1,3-dioxane-2-yl)benzonitril
3.3% 4-(5-butyl-1,3-dioxane-2-yl)benzonitril
13.7% 4-pentylphenyl 4-methylbenzoate
13.8% 4-pentylphenyl 4-propylbenzoate
7.0% 4-pentylphenyl 4-pentylbenzoate
4.0% 4-propylphenyl 4-heptylbenzoate
10.0% 4-pentylphenyl 4-heptylbenzoate
12.5% 4-heptylphenyl 4-heptylbenzoate
11.0% 4'-cyano-4-biphenylyl 4-ethyl-1-cyclohexylcarboxylate
2.5% 4'-cyano-4-biphenylyl 4'-heptyl-4-biphenylcarboxylate
5.0% 4-propylphenyl 4-(4-propylbenzoyloxy)benzoate
9.0% 2-fluoro-4-pentylphenyl 440 -heptyl-4-biphenylcarboxylate
has a clear point of 62° C. and a viscosity of 53m PaS at 20° C.

The properties of the LC compositions described above (Examples A and B) in a twisted nematic cell are compared in Table 1 with those of a commercially available LC composition ZLI-2448-000 (E. Merck, Darmstadt, Germany).

From the results given in Table I it is clearly noted that the LC compositions according to the invention (Examples A and B) have much steeper electro-optical characteristics ($\gamma$).

In addition there is a clear improvement of the viewing-angle dependence of the contrast ($\beta$). The achieved values of $\gamma$ and $\beta$ combined with the low threshold voltage $V_{90}$ allow to realize a dot-matrix twisted nematic liquid crystal display device addressed by multiplex ratios of 1:100, using commercially available driver circuits.

These devices show excellent display performances and practically acceptable operating life-time.

TABLE I

| Item | Conventional example | Example A of this invention | Example B of this invention |
| --- | --- | --- | --- |
| $V_{10,0,25}$ [Volt] (threshold voltage) | 2,19 | 1,83 | 1,90 |
| $\gamma = \dfrac{V_{50,0.25} - V_{10,0.25}}{V_{10,0.25}} \cdot 100\ [\%]$ (steepness of the electro- | 15,9 | 12,8 | 13,0 |

TABLE I-continued

| Item | Conventional example | Example A of this invention | Example B of this invention |
|---|---|---|---|
| optical characteristic) $\beta = \dfrac{V_{10,0,25} - V_{10,40,25}}{\frac{1}{2}(V_{10,0,25} + V_{10,40,25})} \cdot 100\, [\%]$ (viewing-angle dependence) | 23,1 | 18,5 | 18,0 |
| $k_{33}/k_{11}$ (25° C.) Ratio of bend/splay elastic constants, which mainly determines the steepness of the electro-optical characteristic. The smaller the ratio $k_{33}/k_{11}$, the steeper the electro-optical characteristic. | 1,12 | 0,82 | 0.92 |

We claim:

1. A liquid crystal composition containing about 10–25 wt% of at least one compound of the formula I $$5\text{-R-Dio-Ph-CN} \qquad \text{I}$$

wherein R is alkyl of 2 to 5 carbon atoms, Dio is trans-1,3-dioxane-2,5-diyl and Ph is 1,4-phenylene, and
 (a) at least one compound of each of the following groups A to D:

$$R^1\text{-Cy-Ph-}R^2 \qquad \text{A}$$

wherein $R^1$ and $R^2$ are each alkyl of 3 to 5 carbon atoms, Cy is trans-1,4-cyclohexylene and Ph is 1,4-phenylene, $$R^3\text{-Cy-Ph-Ph-}R^4 \qquad \text{B}$$

wherein $R^3$ and $R^4$ are each alkyl of 2 to 5 carbon atoms and Cy and Ph have the meanings indicated above, $$R^5\text{-Cy-Ph-CN} \qquad \text{C}$$

wherein $R^5$ is alkyl of 2 to 5 carbon atoms and Cy and Ph have the meanings indicated above, $$R^6\text{-Cy-COO-Ph-O-}R^7 \qquad \text{D}$$

wherein $R^6$ and $R^7$ are each alkyl of up to 5 carbon atoms and Cy and Ph have the meanings indicated above, and, in addition, in a total amount of 10 to 26% by weight, at least five compounds of the formula E $$5\text{-R}^8\text{-Pyr-Ph-O-}R^9 \qquad \text{E}$$

wherein $R^8$ and $R^9$ are each alkyl of 5 to 11 carbon atoms, Pyr is pyrimidine-2,5-diyl and Ph has the meaning indicated above,
the remainder being the amount of compounds A to D; or
 (b) 25–90% by weight in total of at least one compound of each of the following groups F to K;

$$R^{10}\text{-Ph-COO-Ph-}R^{11} \qquad \text{F}$$

wherein $R^{10}$ and $R^{11}$ are each alkyl of 1 to 7 carbon atoms, Ph has the meaning indicated above, $$R^{12}\text{-Cy-COO-Ph-Ph-CN} \qquad \text{G}$$

wherein $R^{12}$ is alkyl of 1 to 3 carbon atoms, and Cy and Ph have the meaning indicated above, $$R^{13}\text{-Ph-Ph-COO-Ph-Ph-CN} \qquad \text{H}$$

wherein $R^{13}$ is alkyl of 6 to 8 carbon atoms and Ph has the meaning indicated above, $$R^{14}\text{-Ph-COO-Ph-COO-Ph-}R^{15} \qquad \text{J}$$

wherein $R^{14}$ and $R^{15}$ are each alkyl of 1 to 5 carbon atoms and Ph has the meaning indicated above, $$R^{16}\text{-Ph-Ph-COO-PhF-}R^{17} \qquad \text{K}$$

wherein $R^{16}$ and $R^{17}$ each alkyl of 5 to 7 carbon atoms, PhF is fluorinated, 1,4-phenylene

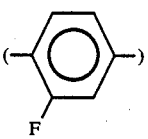

and Ph has the meaning indicated above.

2. In an electro-optical display device based on a liquid crystal composition, the improvement wherein the composition is that of claim 1 whereby the device has a steep electro-optical characteristic ($\gamma$) and a wide viewing angle dependence of the contrast ($\beta$).

3. A composition of claim 1, comprising I and (a).

4. A composition of claim 1, comprising I and (b).

* * * * *